Nov. 11, 1947.  W. C. STEINMETZ  2,430,691
OVERLOAD RELEASE CLUTCH
Filed June 27, 1944
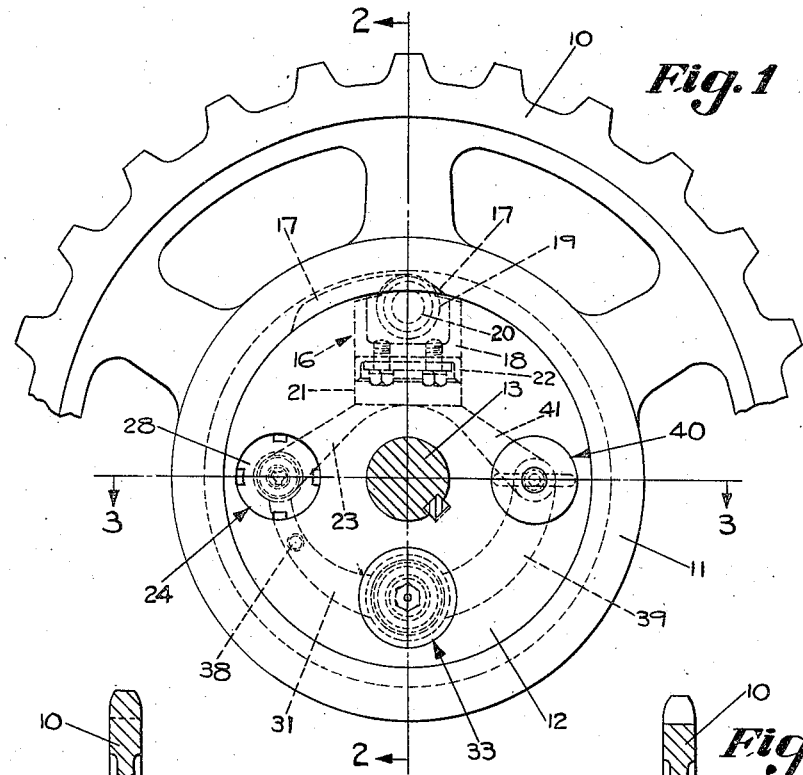
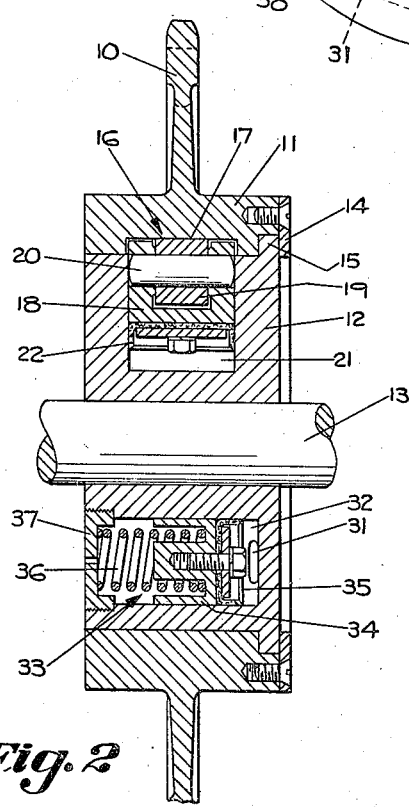
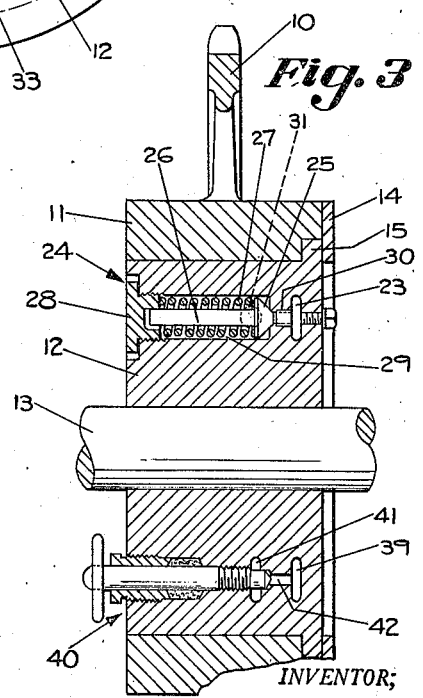
INVENTOR;
WALTER C. STEINMETZ,
BY
ATTY.

Patented Nov. 11, 1947

2,430,691

UNITED STATES PATENT OFFICE 2,430,691

OVERLOAD RELEASE CLUTCH

Walter C. Steinmetz, Columbus, Ohio, assignor, by mesne assignments, to The Jeffrey Manufacturing Company, a corporation of Ohio Application June 27, 1944, Serial No. 542,409

7 Claims. (Cl. 192—56)

This invention relates to an overload release mechanism for releasably interconnecting a driving and a driven member.

An object of the invention is to provide overload release mechanism in which a fluid, and preferably a non-compressible fluid, is trapped in a column and releases in response to a predetermined pressure exerted on a piston connected with said column.

A further object of the invention is to provide such an overload release device in which, upon operation of the releasing mechanism, the fluid will flow into an accumulator or receiver and be stored for subsequent introduction into the system after the parts are re-set to their operative position.

Other objects of the invention will appear hereinafter, the novel features and combinations being set forth in the appended claims.

In the accompanying drawings,

Fig. 1 is an elevational view of a driving sprocket and driven shaft, the latter being shown in section, incorporating the structure of my invention;

Fig. 2 is a sectional view taken on the line 2—2 of Fig. 1, looking in the direction of the arrows; and Fig. 3 is a sectional view taken on the line 3—3 of Fig. 1, looking in the direction of the arrows.

As illustrated in the drawing, the overload release mechanism of my invention is shown interconnecting a driving sprocket and a driven shaft, though it is obvious that a wide variety of driving and driven members may be employed and incorporate said invention.

In said illustrated embodiment there is a driving sprocket 10 having a hub formed of an outer hub ring 11 which is integral with the rim of sprocket 10, and an inner hub cylinder 12 which is keyed to a driven shaft 13. The hub ring 11 may be considered as the driving member, and the hub cylinder 12 as the driven member. These two hub members 11 and 12 are held against axial movement by means of a ring 14, attached to the hub ring 11 by spaced screws, which provides a circumferential groove with the hub ring 11 into which extends a circumferential projection 15 formed as an integral part of the hub cylinder 12. The hub ring 11 is mounted on the hub cylinder 12 so that relative rotation between them is provided except for an overload release mechanism 16 which provides a normal driving connection between the two.

The overload release mechanism 16 includes a radial recess or detent 17 formed in the inner surface or bore of the hub ring 11. As illustrated in Fig. 1 of the drawings, this radial recess extends through an arc of approximately 30° or more, but, if desired, it may be much smaller. The radial extent indicated is provided in case exact radial alinement between the hub cylinder 12 and the hub ring 11 is not necessary.

The recess or detent 17 provides a cam or cam acting surface and it receives a detent 18 which is preferably provided with an anti-friction roller 19 mounted on a pin 20, the detent 18 extending radially beyond the periphery of the hub cylinder 12 and into the radial recess 17 of the hub ring 11, with the roller 19 preferably rolling on and contacting with the bearing or camming surface provided by the recess 17. If desired, the roller 19 may be omitted, providing a sliding contact between the detent 18 and the bottom or cam surface of the radial recess 17.

At least the bottom portion and preferably substantially the entire peripheral portion of the detent 18 provides a piston which fits into a radial cylindrical bore 21 formed in the hub cylinder 12. Said detent or piston 18 is provided with a leather or other desirable type of fluid tight packing 22, providing a substantially leak-proof sliding relation between the piston 18 and the interior cylindrical surface of the bore 21.

The bottom of the cylinder 21 communicates with a passageway 23 formed in the hub cylinder 12 and communicating with a relief valve 24 (see Figs. 1 and 3). The relief valve 24 includes a seat member 25 having a stem 26 surrounded by a helical spring 27 which at one end abuts the seat member 25 and at the other end abuts a removable spring tension adjusting closure nut 28, which closes one end of a recess 29 formed in the hub cylinder 12 within which the operating parts of the relief valve 24 are contained. The seat member 25 normally seats against the periphery of a bore 30 which leads from the passageway 23 to the recess 29. By adjusting the compression of spring 27 the overload will release at adjustable loads.

Under normal conditions the aforedescribed cylindrical bore 21 and the passageway 23 are filled with fluid, preferably a non-compressible fluid, such as oil, grease or even water, though oil is the preferred fluid of all of them. Thus a trapped fluid column is provided that fills completely the cylinder 21 below the packing 22 and completely fills the passageway 23. This holds the detent 18 into the recess 17 and thus provides a driving connection between the driving member 11 and the driven member 12 or between the driving sprocket 10 and the driven shaft 13.

Upon the occurrence of a predetermined overload, camming action between the cam surface provided by the recess 17 and the detent 18, will cause sufficient pressure to be developed in the hydraulic fluid in the cylinder 21 and passageway 23 to open the high pressure relief valve 24 and allow a sufficient amount of the hydraulic fluid or oil to flow through the passageway 23 and past the seating members 25 and 30 of the relief valve 24 and flow into the recess 29 from which it will flow along a path hereinafter described.

This release of the trapped column of fluid under predetermined pressure, of course, will permit the detent or piston 18 to travel radially inwardly sufficiently to allow the driving member or ring 11 to rotate about the driven member or cylinder 12, thus providing for a releasing driving connection between said driving and driven members.

In the preferred embodiment of my invention apparatus is provided to prevent the loss of the hydraulic fluid, such as oil or grease. To this end, such hydraulic fluid as is delivered to the recess 29, will flow therefrom by means of a passageway 31 in the hub cylinder 12 and be delivered to the cylindrical bore 32 of an accumulator or receiver 33, said bore 32 being formed in the hub cylinder 12.

The accumulator or receiver 33 includes a spring-pressed piston 34 provided with a seal 35 and a spring 36 working against the piston 34 and a removable head 37.

It is evident that hydraulic fluid delivered to the passageway 31 under pressure, as it passes through the overload relief valve 24, will flow against the piston 34 and move it to the left as viewed in Fig. 2 of the drawings, compressing the spring 36. In other words, the hydraulic fluid which is pushed from the cylinder 21 in response to an overload release, will be accumulated in the accumulator 33 for future use.

Communicating with the passageway 31 is a check valve operating fitting 38 by which new hydraulic fluid, oil or grease, may be introduced thereinto to compensate for any loss thereof. This fitting will also be employed when the apparatus is initially filled with the fluid.

To restore the detent 18 to a driving position and thus to interlock the driving and driven members therethrough, following a release thereof, mechanism is provided to deliver the fluid from the accumulator 33 back to the cylinder 21 to move the piston or detent 18 radially outwardly. Such mechanism includes a passageway 39 formed in the hub cylinder 12 and communicating from the bore 32 to the right of the piston 34, as viewed in Fig. 2 of the drawing, and leading to a manually operable needle valve 40 which controls the flow of said hydraulic fluid from the passageway 39 to a passageway 41 by way of a bore 42. The passageway 41 communicates directly with the cylinder or bore 21 inwardly of the piston 18 and packing 22. Obviously, by unseating the needle valve 40, the accumulator 33 will act under the influence of its spring 36 to force the hydraulic fluid accumulated therein through the passageways 39 and 41 by way of bore 42 to push the piston or detent 18 radially outward, as permitted by the re-alined condition of the hub ring 11 and the hub cylinder 12. Thus the hydraulic fluid will again be trapped in the cylinder 21 and radially inwardly of the piston 18 after the needle valve 40 is closed.

In the operation of the device the various parts will be in the positions illustrated in the drawing, and the detent 18 will be received in the recess 17 to provide a releasable driving connection between the driving member 10, 11 and the driven member 12, 13. The bore 21 below packing 22, and passageways 23, 31, 39 and 41 will be filled with oil, grease or liquid preferably devoid of compressible fluid or air. Upon the occurrence of an overload condition on the driven member, the camming action between the bearing surface of the ring 11 adjacent the radial recess 17 and the detent 18, or more specifically the roller 19 thereof, will force the piston or detent 18 radially inwardly, with sufficient pressure being created in the hydraulic fluid, gas, oil or grease, to open the high pressure relief valve 24, thus permitting escape of the trapped column of fluid and permitting it to flow through passageways 23 and 31 by way of recess 29 into the accumulator 33 where it may be stored for future use.

After the overload condition has been removed, or, if desired, a test to see if it has cleared, the operator will open the needle valve 40 following alinement of the detent 18 with the recess 17, and the spring 36 of the accumulator 33 will force the hydraulic fluid through the passageways 39 and 41 by way of bore 42 to move the detent 18 radially outwardly to re-seat the desired releasable driving connection between the ring 11 and cylinder 12. Thereupon, the needle valve 40 will be closed to prevent a reverse flow of the hydraulic fluid back into the accumulator 33 under operating conditions. Thus the parts will be restored to their normal operating positions.

The operation of the device is the same, regardless of the direction of rotation of sprocket 10. That is, it operates equally well in reverse directions of rotation of the driving and driven members. It will be seen that the mechanism is completely reversible in that the shaft may drive the sprocket or the sprocket may drive the shaft and that the device is equally responsive to overload conditions regardless of which member is the driven member.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An overload release device including a driving member and a driven member, means mounting said members for relative rotation, means releasably connecting said members together including a detent, a cylinder, a piston in said cylinder connected to hold said detent normally to provide a driving connection between said members, a relief valve connected with said cylinder, a lubricating fluid in said cylinder normally filling it and operable in response to movement of said piston under the influence of excessive load on said detent to force said fluid through said relief valve, an accumulator connected to receive fluid passing through said relief valve and storing it under pressure, and valve means operable to deliver the fluid from said accumulator back to said cylinder when said piston is restored to its normal position.

2. An overload release device including a driving member and a driven member, means mounting said members for relative rotation, means releasably connecting said members together including a detent, a cylinder, a piston in said cylinder connected to hold said detent normally to provide a driving connection between said members, a relief valve connected with said cylinder, a fluid in said cylinder normally filling it and operable in response to movement of said piston under the influence of excessive load on said detent to force said fluid through said relief valve, an accumulator connected to receive fluid passing through said relief valve and storing it under pressure, and means operable to deliver the fluid from said accumulator back to said cylinder when said piston is restored to its normal position.

3. A manually resettable overload release mechanism adapted to sever completely its driving function in response to an overload driving condition until reset including a driving member and a driven member bearinged for rotation with respect to one another on a common axis, one of said members including a cylinder positioned to one side of said axis and a fluid receiving chamber and the other of said members including means forming a detent, a piston in said cylinder having detent means engaging said first named detent tending to hold said driving and driven members to rotate together and being depressed whenever they rotate relative to each other because of overload on the driven member, a substantially non-compressible fluid trapped in said cylinder and acting against said piston to extend said piston detent means to engage said first named detent means, a relief valve connected with said cylinder operable only in response to a predetermined fluid pressure in said cylinder for exhausting fluid therefrom into said fluid receiver, and manually operable valve means through which fluid may be introduced into said cylinder to reset said overload release mechanism.

4. A manually resettable reversible overload release mechanism adapted when operated to sever completely its driving function including a driving member and a driven member, one of said members including a hub having a radially extending cylinder and a fluid receiver formed therein, the other of said members fitting and bearinged for rotation upon said hub and having a recess formed therein, a piston in said cylinder having detent means extending into said recess in said other member tending to hold said driving and driven members to rotate together and being depressed whenever they rotate relative to each other because of overload on the driven member, a substantially non-compressible fluid trapped in said cylinder and acting against said piston to extend said piston detent means into said recess, a relief valve connected with said cylinder operable in response to a predetermined fluid pressure in said cylinder for exhausting fluid therefrom into said fluid receiver, and manually operable valve means through which fluid may be introduced into said cylinder to reset said overload release mechanism.

5. A resettable reversible overload release mechanism adapted when operated to sever completely its driving function including a driving member and a driven member, one of said members including a hub having a radially extending cylinder formed therein, the other of said members fitting and bearinged for rotation upon said hub and having a recess formed therein, a piston in said cylinder having detent means extending into said recess in said other member tending to hold said driving and driven members to rotate together and being depressed whenever they rotate relative to each other because of overload on the driven member, a substantially non-compressible fluid trapped in said cylinder and acting against said piston to extend said piston detent means into said recess, a relief valve connected with said cylinder operable in response to a predetermined fluid pressure in said cylinder for exhausting fluid therefrom, and valve means through which fluid may be introduced into said cylinder to reset said overload release mechanism.

6. A resettable reversible overload release mechanism adapted when operated to sever completely its driving function including a driving member and a driven member, one of said members including a hub having a cylinder formed therein positioned to one side of the axis thereof, the other of said members fitting and bearinged for rotation upon said hub and having a recess formed therein, a piston in said cylinder having detent means extending into said recess in said other member tending to hold said driving and driven members to rotate together and being depressed whenever they rotate relative to each other because of overload on the driven member, a substantially non-compressible fluid trapped in said cylinder and acting against said piston to extend said piston detent means into said recess, a relief valve connected with said cylinder operable in response to a predetermined fluid pressure in said cylinder for exhausting fluid therefrom, and valve means through which fluid may be introduced into said cylinder to reset said overload release mechanism.

7. A reversible overload release mechanism adapted when operated to sever completely its driving function including a driving member and a driven member, one of said members including a hub having a cylinder formed therein positioned to one side of the axis thereof, the other of said members fitting and bearinged for rotation upon said hub and having a recess formed therein, a piston in said cylinder having detent means extending into said recess in said other member tending to hold said driving and driven members to rotate together and being depressed whenever they rotate relative to each other because of overload on the driven member, a substantially non-compressible fluid trapped in said cylinder and acting against said piston to extend said piston detent means into said recess, and a relief valve connected with said cylinder operable in response to a predetermined fluid pressure in said cylinder for exhausting fluid therefrom.

WALTER C. STEINMETZ.

REFERENCES CITED

The following references are of record in the file of this patent:

UNITED STATES PATENTS

| Number | Name | Date |
| --- | --- | --- |
| 1,919,437 | LeFevre | July 25, 1933 |
| 2,293,786 | Worden | Aug. 25, 1942 |

FOREIGN PATENTS

| Number | Country | Date |
| --- | --- | --- |
| 544,230 | Great Britain | Apr. 2, 1942 |
| 611,897 | Germany | 1935 |